(12) United States Patent
Landbeck et al.

(10) Patent No.: US 10,011,246 B2
(45) Date of Patent: Jul. 3, 2018

(54) BELT TENSIONER FOR A SAFETY BELT SYSTEM

(71) Applicant: TRW AUTOMOTIVE GMBH, Aldorf (DE)

(72) Inventors: Adrian Landbeck, Schwäbisch Gmünd (DE); Alexander Waidmann, Schwäbisch Gmünd (DE); Bernd Hofmann, Aalen (DE)

(73) Assignee: TRW Automotive GmbH (DE)

( * ) Notice: Subject to any disclaimer, the term of this patent is extended or adjusted under 35 U.S.C. 154(b) by 114 days.

(21) Appl. No.: 15/034,899

(22) PCT Filed: Nov. 5, 2014

(86) PCT No.: PCT/EP2014/002956
§ 371 (c)(1),
(2) Date: May 6, 2016

(87) PCT Pub. No.: WO2015/067360
PCT Pub. Date: May 14, 2015

(65) Prior Publication Data
US 2016/0288769 A1    Oct. 6, 2016

(30) Foreign Application Priority Data
Nov. 8, 2013 (DE) .................. 10 2013 018 722

(51) Int. Cl.
*B60R 22/46* (2006.01)

(52) U.S. Cl.
CPC ...... *B60R 22/4628* (2013.01); *B60R 22/4633* (2013.01); *B60R 22/4676* (2013.01); *B60R 2022/468* (2013.01)

(58) Field of Classification Search
CPC .......... B60R 22/4633; B60R 2022/468; B60R 22/4628; B60R 22/4676
See application file for complete search history.

(56) References Cited

U.S. PATENT DOCUMENTS

| 6,419,176 | B1  | 7/2002  | Mizuno |
| 6,932,324 | B2* | 8/2005  | Biller ................. B60R 22/1952 254/230 |
| 9,610,920 | B2* | 4/2017  | Yanagawa ........... B60R 22/3413 |
| 2011/0297776 | A1 | 12/2011 | Ito et al. |

(Continued)

FOREIGN PATENT DOCUMENTS

| DE | 19512660     | 10/1995 |
| DE | 102006031359 | 10/2007 |

(Continued)

*Primary Examiner* — James A English
(74) *Attorney, Agent, or Firm* — Tarolli, Sundheim, Covell & Tummino LLP

(57) ABSTRACT

A belt tensioner for a seat belt system comprises a pinion (10) pivoted about an axis of rotation A which is adapted to be coupled to a best reel of a belt retractor, a drive unit, a force transmission element (12) and a guide means. By activating the drive unit the force transmission element (12) is moved along the guide means so that it engages in the pinion (10). The guide means includes a portion (16) which is deformable in a direction x perpendicular to the axis of rotation A of the pinion (10) and to the direction of movement y of the force transmission element (12).

12 Claims, 1 Drawing Sheet

(56) References Cited

U.S. PATENT DOCUMENTS

| | | | |
|---|---|---|---|
| 2013/0327672 A1 | 12/2013 | Gentner et al. | |
| 2013/0327873 A1* | 12/2013 | Gentner | B60R 22/4628 |
| | | | 242/374 |
| 2014/0014758 A1 | 1/2014 | Gentner et al. | |
| 2014/0145020 A1 | 5/2014 | Gentner et al. | |
| 2015/0298926 A1* | 10/2015 | Okubo | B60R 22/4628 |
| | | | 242/535 |
| 2016/0114762 A1* | 4/2016 | Landbeck | B60R 22/4628 |
| | | | 242/374 |

FOREIGN PATENT DOCUMENTS

| | | | |
|---|---|---|---|
| DE | 102010051463 | | 5/2012 |
| EP | 1207088 | | 5/2002 |
| JP | 2014201156 A | * | 10/2014 |
| WO | 2012065655 | | 5/2012 |

* cited by examiner

1

BELT TENSIONER FOR A SAFETY BELT SYSTEM

This application corresponds to PCT/EP2014/002956, filed Nov. 5, 2014, which claims the benefit of German Application No. 10 2013 018 722.2, filed Nov. 8, 2013, the subject matter, of which is incorporated herein by reference in their entirety.

BACKGROUND OF THE INVENTION

The invention relates to a belt tensioner for a seat belt system.

In general, for checking the functional safety of belt tensioners both the Intended use, i.e. the use of the belt tensioner in the mounted state in the vehicle in the case of crash, and the not intended use, e.g. undesired triggering during production, during transport etc., have to be taken into account. These different load cases are based on different loading states.

Virtually all known construction modes of pyrotechnic belt tensioners show undesired variation in the webbing retraction performance in different loading states, for the components of a belt tensioner sometimes present a strongly different behavior in dependence on the external circumstances, especially In respect of temperature and component tolerances.

SUMMARY OF THE INVENTION

It is the object of the invention to make available a constant tensioning performance that is preferably independent of the outer circumstances.

The invention is especially Intended to be suited for a type of belt tensioner that has become known from DE 10 2006 031 359 A1. In this type of tensioner, instead of a tooth rack being linearly moved through a drive unit, a force transmission element which, although being fixed, is substantially deformable engages in a pinion coupled to a belt reel so as to rotate the same in a tensioning direction. The elongate and deformable force transmission element can be accommodated in a curved tensioner tube In a space-saving manner and provides for smooth introduction of the force transmission element to the pinion so that the tooth-on-tooth problem occurring in a toothed rack can be avoided. Further belt tensioners of this type are shown, inter alia, in DE 10 2010 051 418 A1, DE 10 2010 051 419 A1, DE 10 2010 051 420 A1, DE 10 2010 051 422 A1, DE 10 2010 051 463 A1 and DE 10 2011 016 153 A1.

This object is achieved by a belt tensioner comprising the features of claim 1. Advantageous and useful configurations of the device according to the invention are described in the subclaims.

The belt tensioner according to the invention for a seat belt system comprises a pinion pivoted about an axis of rotation which is adapted to be coupled to a belt reel of a belt retractor, a drive unit, a force transmission element and a guide means. By activating the drive unit the force transmission element is moved along the guide means so that it engages in the pinion. In accordance with the invention, the guide means includes a portion which is deformable in a direction perpendicular to the axis of rotation of the pinion and to the direction of movement of the force transmission element (direction of deformation).

The invention is based on the finding that especially the engagement factor between the force transmission element and the pinion providing for the conversion of the kinematic energy of the force transmission element into energy of rotation of the pinion is responsible for the variation of the performance of the belt tensioner. According to the present invention, the dependence of the transverse forces acting on the force transmission element on the manufacturing and mounting tolerances and the temperature is encountered by the tact that the guide means for the force transmission element carries out an automatic adjustment of the engagement factor where required. In the case of high transverse forces the force transmission element can deflect the guide portion so that the engagement factor and thus the transverse forces are reduced. In this way an optimum engagement factor for the force transmission to the pinion is constantly ensured. As a result, the tensioning performance is largely constant under various preconditions (tolerances, temperature) and, resp., in the case of equal power distribution larger tolerances as regards the manufacture and mounting of the components and of the temperature may be admitted.

For a most efficient automatic adjustment of the engagement factor the deflectable guide portion should be arranged in the area of the guide means in which the force transmission element engages in the pinion. The transverse forces then can be immediately exploited, without any further diversion, for the deformation of the guide portion which enables the desired deviation of the force transmission element.

The guide portion may be part of a pressure cylinder in which the force transmission element is accommodated. Especially the guide portion may be designed as a one-sided extension of the pressure cylinder output (mouth) ahead of the pinion. In such structure no additional component is required and possible mounting tolerances are dropped.

According to a preferred embodiment of the belt tensioner according to the invention, the guide portion rests on a housing wall, wherein the guide portion is spaced from an indentation of the housing wall by a gap. The housing wall determines a defined deformation area for the guide portion by the indentation. While the stable housing wall on the one hand prevents deformation, the indentation, on the other hand, permits (limited) deflection of the guide portion so that the force transmission element may deviate in the direction of the indentation.

In order to ensure in the case of deformation of the guide portion that the movement of the deflected force transmission element is not obstructed, the width of the gap in the direction of deformation should not be larger than the thickness of the guide portion in this direction. In this way it can be excluded that apart from the guide portion also the force transmission element itself is pressed info the indentation. This would mean that further deflection of the force transmission element against the direction of deformation would be necessary to remove the same from the indentation again.

For defined deformation of the guide portion the indentation may include a front edge relative to the direction of movement of the force transmission element about which the guide portion is bent while being deformed.

An alternative structure of the belt tensioner according to the invention provides that the guide portion rests on a housing wall, wherein a central part of the guide portion faces a recess of the housing wall. In this structure the recess enables the force transmission element to press the guide portion through the recess (to a limited extent) so that the guide portion is "indented". The fact that in this case a central part and not a free end of the guide portion has to be concerned is important in so far as sufficient overlap of the guide portion ahead of and behind the recess (viewed in the direction of movement of the force transmission element) has to be ensured so that the guide portion cannot slip through the recess.

For a well-targeted influence of the deformation of the guide portion an elastic support may be provided for the guide portion in the area of the recess. In this way a defined resistance may be set to counteract the deformation.

The conception of the present invention is especially suited for a belt tensioner in which the force transmission element is formed of a substantially deformable preferably elastomeric material.

BRIEF DESCRIPTION OF THE DRAWINGS

Further features and advantages of the invention will result from the following description and from the enclosed drawings which are referred to and in which.

DESCRIPTION

Figure 1:
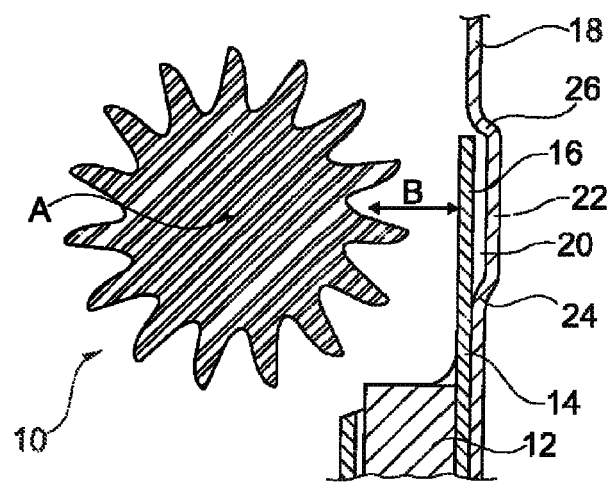
FIG. 1 shows a sectional view of a cutout of a belt tensioner according to the invention before a tensioning operation.

In FIG. 1 a pinion 10, a force transmission element 12 and a guide means of a belt tensioner are schematically illustrated.

The pinion 10 is rotatably supported shout an axis A and is coupled either permanently or only as required to a belt reel of a belt retractor in a rotationally fixed manner.

The force transmission element 12 which is preferably made of a substantially deformable elastomeric material is accommodated in a tubular pressure cylinder 14 so that in the mounted state it is not engaged in the pinion 10. In this way, in the normal operation of the belt retractor 10, i.e. before possible activation of the belt tensioner, unhindered rotation of the belt reel is possible. Preferably the force transmission element is elongate, wherein its length is a multiple of its diameter and is formed substantially in one piece, i.e. one single force transmission element interacts with the pinion 10.

The pressure cylinder 14 includes at its outlet an extended guide portion 16 which is opposed to the teeth of the pinion 10 at a certain distance in a direction x. Said guide portion 16 rests on a housing wall 18.

The free end of the guide portion 18 is spaced fern an indentation 22 of the housing wall 18 by a gap 20, however. The width of the gap 20 in the direction x approximately corresponds to the thickness of the guide portion 16 in this direction. The indentation 22 may also be formed by an appropriate material thinning in the housing wall 18.

The indentation 22 extends over a length corresponding approximately to the area in which the force transmission element 12 engages in the pinion 10 when it is moved along the guide portion 16, as will be described later.

In the shown embodiment, the guide portion 18 of the pressure cylinder 14 and the housing wall 18 including the indentation 22 thus form the afore-mentioned guide means for the force transmission element 12.

A drive unit preferably comprising a pyrotechnic drive is connected to the input (not visible) of the pressure cylinder 14.

When the drive unit is activated in a case of restraint a pressure gas is generated for filling the portion of the pressure cylinder 14 positioned between the drive unit and the force transmission element 12. By pressurization the force transmission element 12 is moved along the guide portion 16 in the direction y toward the pinion 10 and past the same, wherein the teeth of the pinion 10 penetrate the material of the force transmission element 12. By the engagement factor—in FIG. 1 indicated by the double arrow B—of the pinion 10 and the force transmission element 12 the pinion 10 and the belt reel of the belt retractor coupled thereto are rotated so that webbing is retracted.

Figure 2:
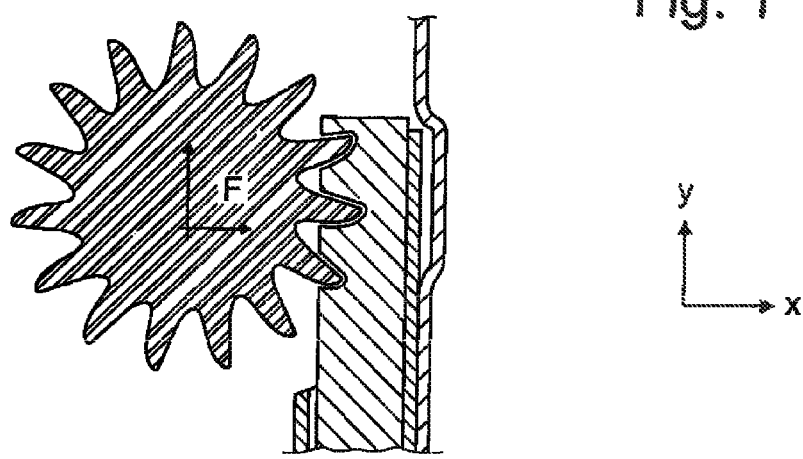
FIG. 2 shows the belt tensioner from FIG. 1 during a tensioning operation without adaptation of the guide means.

FIG. 2 illustrates a tensioning operation in which no adaptation of the guide means is carried out. In this case the engagement factor allowing the conversion of the kinematic energy of the force transmission element 12 into rotational energy of the pinion 10 is smaller than in the case shown in FIG. 3. The belt tensioner is designed—especially the stiffness of the force transmission element 12—so that said engagement ensures optimum force transmission.

Figure 3:
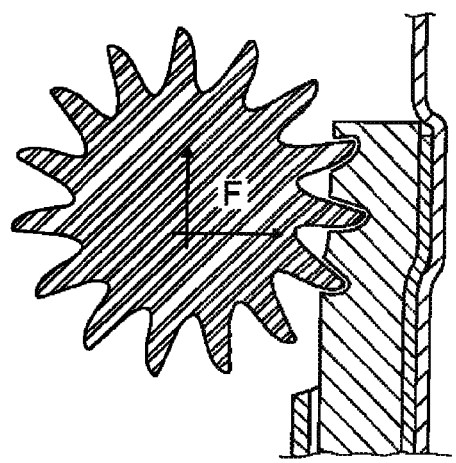
FIG. 3 shows the belt tensioner from FIG. 1 during a tensioning operation with adaptation of the guide means.

In the tensioning operation shown in FIG. 3 the engagement factor and the related forces acting in the direction x between the force transmission element 12 and the pinion 10 are definitely larger. This may be especially due to tolerances during manufacture and the assembly of the components. Temperature influences, too, may be responsible for different force ratios. For example, the force transmission element 12 is harder at lower temperatures than at higher temperatures.

As is evident in FIG. 3, the force transmission element 12 may deviate transversely to its direction of movement—more exactly in the direction x perpendicular to the direction of movement y of the force transmission element 12 and to the axis of rotation A of the pinion 10—, when high transverse forces are acting. This is possible because the force transmission element 12 presses onto the guide portion 16 so that the latter is bent about a front edge 24 and is urged into the indentation 22 of the stable housing wall 18. The deformation of the guide portion 16 may be elastic or plastic—depending on the material of the pressure cylinder. Since the gap 20 is not wider than the thickness of the guide portion 16, the rear edge 26 of the indentation is no substantial obstacle to the further movement of the force transmission element 12.

Thanks to the automatic adaptation of the guide means achieved in this way which enables the force transmission element 12 to deviate, the engagement factor and the related transverse forces may be reduced. In this way, any impairment of the force transmission to the pinion 10 or even seizing of the force transmission element 12 is efficiently counteracted.

According to an alternative design concept (not shown), instead of the indentation 22 also a recess (gap) may be provided in the housing wall 18, wherein the guide portion 16—viewed in the direction of movement y of the force transmission element 12—extends beyond the recess. In this case, with appropriately high transverse forces—depending on the material of the pressure cylinder—the guide portion 16 is elastically or plastically indented in the transverse direction x. The guide portion 16 should protrude sufficiently from the rear edge 26 of the recess so that the rear edge 26 (Just as the front edge 24) may serve as support and so that the free end of the guide portion 16 cannot slip into the recess during deformation. The deformation of the guide portion 16 may be selectively influenced by providing an elastic support for the guide portion 16 in the area of the recess.

LIST OF REFERENCE NUMERALS 10 pinion
12 force transmission element
14 pressure cylinder
16 guide portion
18 housing wall
20 gap
22 indentation
24 front edge
26 rear edge

The invention claimed is:

1. A belt tensioner for a seat belt system, comprising:
a pinion (10) pivoted about an axis of rotation A which is adapted to be coupled to a belt reel of a belt retractor,
a drive unit,
a force transmission element (12) and
a guide means,
wherein the force transmission element (12) is moved along the guide means by activation of the drive unit so that the force transmission element (12) engages in the pinion (10),
and wherein the guide means includes a guide portion (16) which is adapted to be deformed in a direction x perpendicular to the axis of rotation A of the pinion (10) and to a direction of movement y of the force transmission element (12).

2. The belt tensioner according to claim 1, wherein the guide portion (16) is arranged in an area of the guide means in which the force transmission element (12) engages in the pinion (10).

3. The belt tensioner according to claim 1, wherein the guide portion (16) is part of a pressure cylinder (14) in which the force transmission element (12) is accommodated.

4. The belt tensioner according to claim 3, wherein the guide portion (16) rests on a housing wall (18), wherein the guide portion (16) is spaced from an indentation (22) of the housing wall (18) by a gap (20).

5. The belt tensioner according to claim 4, wherein a width of the gap (20) in the direction x is not larger than a thickness of the guide portion (16) in the direction x.

6. The belt tensioner according to claim 4, wherein the indentation (22) has a front edge (24) related to the direction of movement y of the force transmission element (12) about which edge the guide portion (16) is bent during deformation thereof.

7. The belt tensioner according to claim 1, wherein the guide portion (16) rests on a housing wall (18), wherein a central part of the guide portion (16) faces a recess of the housing wall (18).

8. The belt tensioner according to claim 7, wherein in an area of the recess an elastic support for the guide portion (16) is provided.

9. The belt tensioner according to claim 1, wherein the force transmission element (12) is made of a substantially deformable material.

10. The belt tensioner according to claim 1, wherein teeth of the pinion (10) dig into material of the force transmission element (12) during force transmission.

11. The belt tensioner according to claim 1, wherein the force transmission element includes at least one integral portion a length of which is a multiple of a diameter of the at least one integral portion.

12. The belt tensioner according to claim 9, wherein the substantially deformable material is an elastomeric material.

* * * * *